United States Patent [19]

Miyagi

[11] Patent Number: 4,819,066

[45] Date of Patent: Apr. 4, 1989

[54] IMAGE PROCESSING APPARATUS

[75] Inventor: Ken Miyagi, Yokohama, Japan

[73] Assignee: Canon Kabushiki Kaisha, Tokyo, Japan

[21] Appl. No.: 898,096

[22] Filed: Aug. 20, 1986

[30] Foreign Application Priority Data

Aug. 29, 1985 [JP] Japan .................................. 60-188396

[51] Int. Cl.$^4$ ........................................... G03G 15/00
[52] U.S. Cl. .................................. 355/14 E; 358/283; 355/3 R
[58] Field of Search ............. 355/3 R, 14 E; 346/108, 346/153.1, 160; 358/296, 298, 280, 283

[56] References Cited

U.S. PATENT DOCUMENTS 4,375,064  2/1983  Ohara .................................... 346/108
4,624,547  11/1986  Endo et al. ......................... 355/14 E
4,626,923  12/1986  Yoshida ................................ 358/298

FOREIGN PATENT DOCUMENTS 52-106737  9/1977  Japan .

OTHER PUBLICATIONS

IBM Technical Disclosure Bulletin, vol. 20, No. 1, Jun. 1977, pp. 31 and 32.

Primary Examiner—Patrick R. Salce
Assistant Examiner—Judith H. Jones
Attorney, Agent, or Firm—Fitzpatrick, Cella, Harper & Scinto

[57] ABSTRACT

An image processing apparatus comprises a image data generator, a pulse width modulated signal generator for generating a pulse width modulated signal to modulate a beam in accordance with an image data generated by the image data generator, and a control signal generator for generating a control signal to control an intensity of the beam in accordance with the image data generated by the image data generator.

14 Claims, 8 Drawing Sheets

IMAGE PROCESSING APPARATUS

BACKGROUND OF THE INVENTION

1. Field of the Invention

The present invention relates to an image processing apparatus for reproducing a high quality image.

2. Related Background Art

Figure 3:
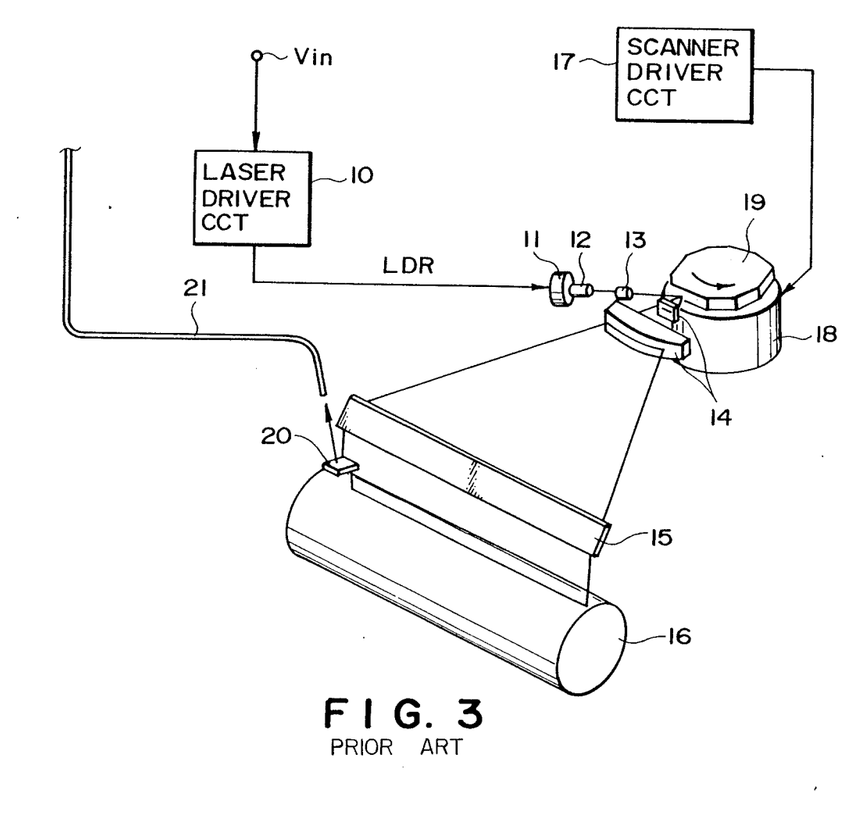
FIG. 3 shows a principle configuration of a prior art laser beam printer.

A laser beam printer has become popular because of its high image quality and high speed. FIG. 3 shows a principle configuration of a prior art laser beam printer. In FIG. 3, an image input signal Vin represented by a bit ON/OFF level is amplified by a laser driver 10 where it is converted to an ON/OFF level signal LDR for driving a laser unit 11, which may be a semiconductor laser. A light beam emitted from the semiconductor laser passes through an optical system comprising a collimeter lens 12, a cylindrical lens 13, a focusing lens 14 and a mirror 15, and it is focused such that the spot diameter of the light beam is constant at any axial point on a surface of a drum 16. A scanner motor 18 driven by a scanner driver 17 rotates a 10-sided mirror 19 to linescan the laser beam axially of the drum. Thus, an electrostatic latent image is formed on the surface of the photoconductor drum in accordance with the input image signal. Toner (black) is left in this area in a subsequent development process so that the electrostatic latent image is visualized. A change of a potential on the surface of the drum correlates to an irradiation time of the laser beam and a beam intensity (power). In the laser beam printer described above, only a binary white-black image can be reproduced because the irradiation width per dot is constant and the beam intensity is constant. When a continuous density image such as a photograph is to be reproduced, gray levels may be reproduced by a dither method. However, since such an image is an aggregation of white and black dots, it is not sufficient to adequately represent the continuous density.

SUMMARY OF THE INVENTION

It is an object of the present invention to eliminate the drawbacks described above.

It is another object of the present invention to improve an image processing apparatus.

It is still another object of the present invention to provide an image processing apparatus capable of reproducing a high quality image.

It is yet another object of the present invention to provide an image processing apparatus capable of reproducing an image with a simple construction.

It is another object of the present invention to provide an image processing apparatus capable of reproducing a high quality image at a high speed.

It is still another object of the present invention to provide an image processing apparatus capable of reproducing a high quality image having a high resolution and a high tonality.

It is another object of the present invention to provide an image processing apparatus which can readily reproduce the exact density of an original image and can easily compensate for a density due to differences between different types of apparatus.

It is still another object of the present invention to provide an image processing apparatus which can correctly reproduce the density of an original image and which also can emphasize or deemphasize a certain density.

Other objects of the present invention will be apparent from the following description of the invention and the claims.

DETAILED DESCRIPTION OF THE PREFERRED EMBODIMENTS

Figure 4A:
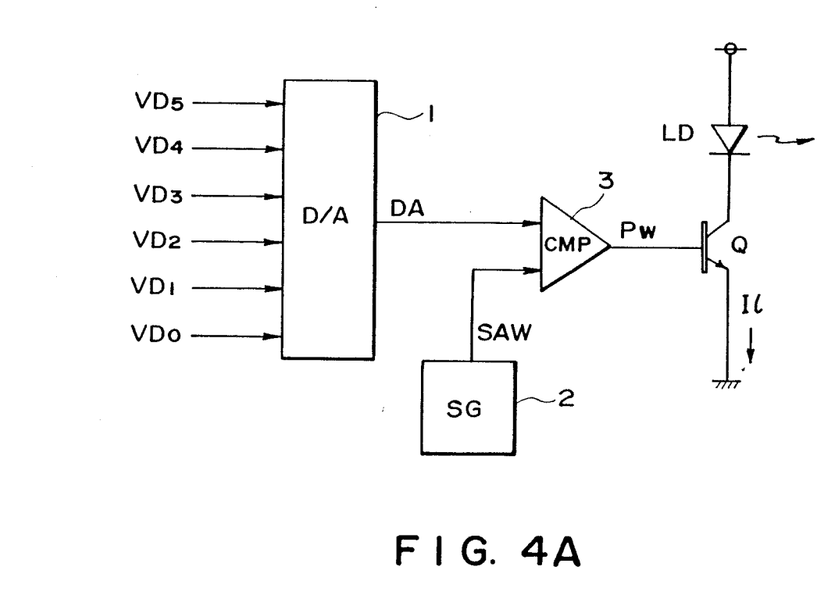
FIG. 4A shows a block diagram of a pulse width modulator which may be used in a laser beam printer.
Figure 4B:
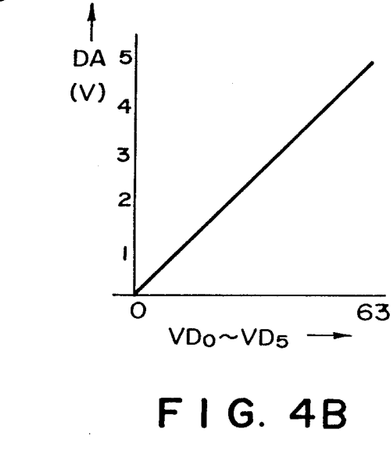
FIG. 4B shows a graph of the relationship between image density data $VD_0-VD_5$ and D/A converted image density signal DA.
Figure 4C:
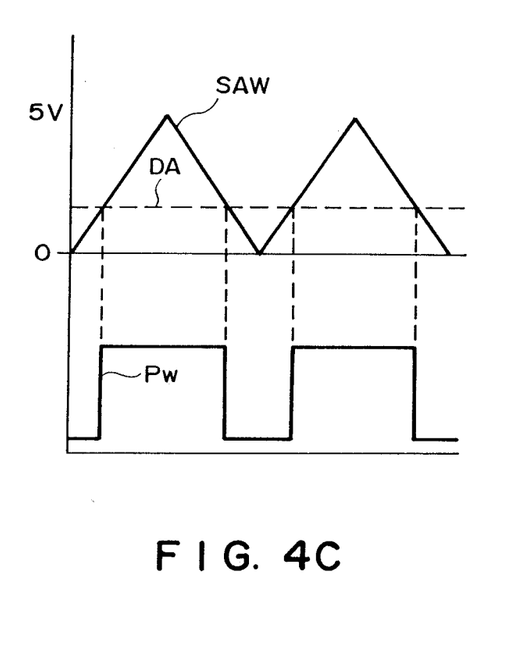
FIGS. 4C and 4D show timing charts of pulse width modulation of a triangle wave.
Figure 4D:
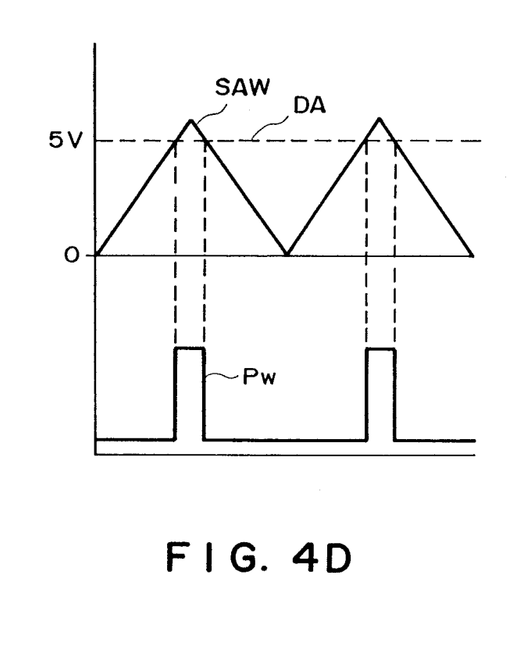

As a method for improving the defect in the gray level reproduction by the dither method, a laser beam may be represented by a pulse width modulator as a continuous time difference of a pulse width in accordance with a density. FIG. 4A shows a block diagram of a pulse width modulator. Image density data $VD_0-VD_5$ are represented by six bits parallel and the image density is represented by one of 64 bit combinations 0–63, as shown in FIG. 4B, for example, "0" represents a white density and "63" represents a black density. The image data is converted to a DC level by a digital-analog (D/A) converter 1 so that 0 volts represents the white density and 5 volts represents the black density. The converted DC level signal DA is applied to one input terminal of a comparator (CMP) 3, and a triangle wave signal SAW generated by a signal generator (SG) 2 is applied to the other input terminal of the comparator 3. The levels of the triangle wave signal SAW and the image signal DA are compared by the comparator 3, which produces a pulse width modulated signal Pw as shown in FIGS. 4C and 4D. When the image signal is close to the white level, the pulse width of the signal Pw is wide so that the laser diode LD is turned on for a relatively long period. When the image signal is close to the black level, the pulse width is narrow and the laser diode LD is turned on for a relatively short period. Thus, the bit-parallel data is converted to the image signal Pw whose pulse width continuously changes. As a result, the tonality is smoothly expressed and the reproducibility of the photograph is improved.

However, the image processing apparatus shown in FIG. 4 is not designed to take into account various changes in the tonality of the reproduced image. For example, if a tonality-density characteristic of the input image data is not linear, it must be compensated for in a complex manner by a pulse width modulation system. As a result, the configuration of the apparatus is complex and the apparatus is expensive. Further, even if the tonality - density characteristic of the input image data is linear, a desired reproduced image may not be obtained if there is a variation in the sensitivity characteristic of the photoconductor drum, in the developer density and the conditions of development, or in the conditions of transferring the image to a sheet. It is very difficult to compensate for such variations by a pulse width modulation system, and it may be rather resolved by adjusting the drum sensitivity characteristic and the development characteristic.

In the present embodiment, the compensations for such variations can be attained with a simple configuration.

Figure 1A:
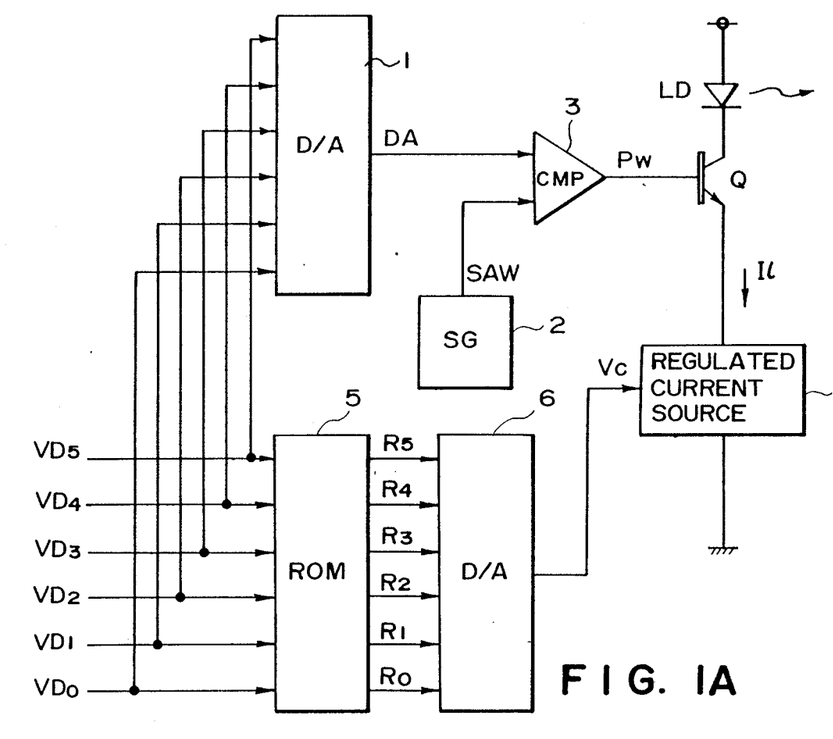
FIG. 1A is a block diagram of a density conversion unit of an image processing apparatus in accordance with one embodiment of the present invention.
Figure 1B:
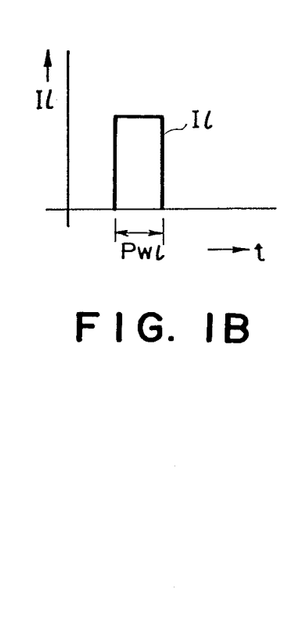
FIG. 1B shows a timing chart of a driving current wave form for a laser diode LD.
Figure 2A:
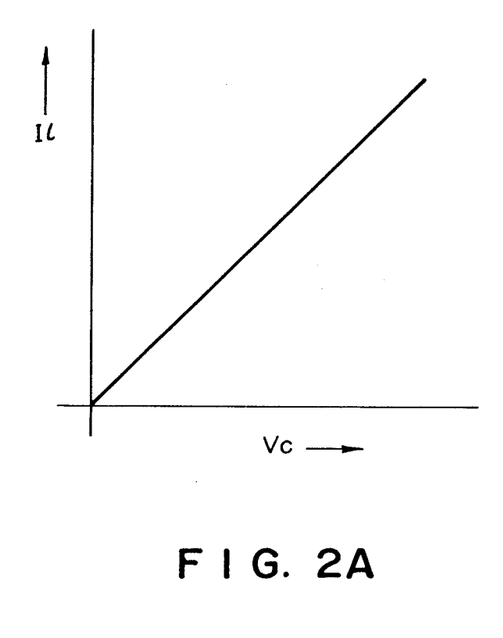
FIG. 2A shows a graph illustrating the relationship between a current controlled voltage Vc and a constant current Il in a constant (regulated) current source 4.
Figure 2B:
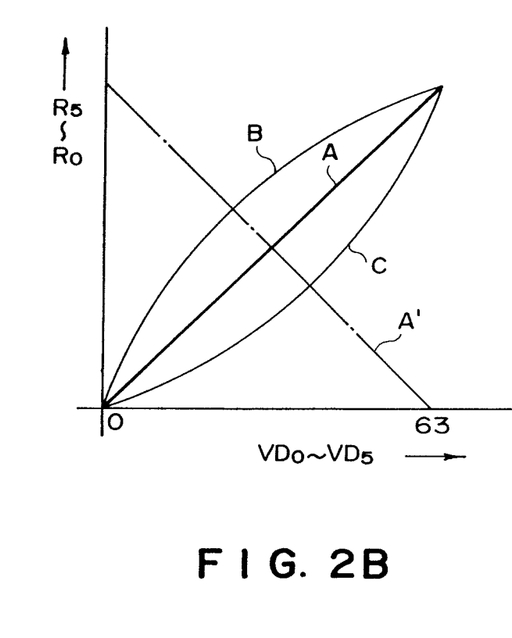
FIGS. 2B and 2C show graphs of the relationship between input image data $VD_0-VD_5$ and output data $R_0-R_5$ in a ROM 5.
Figure 2C:
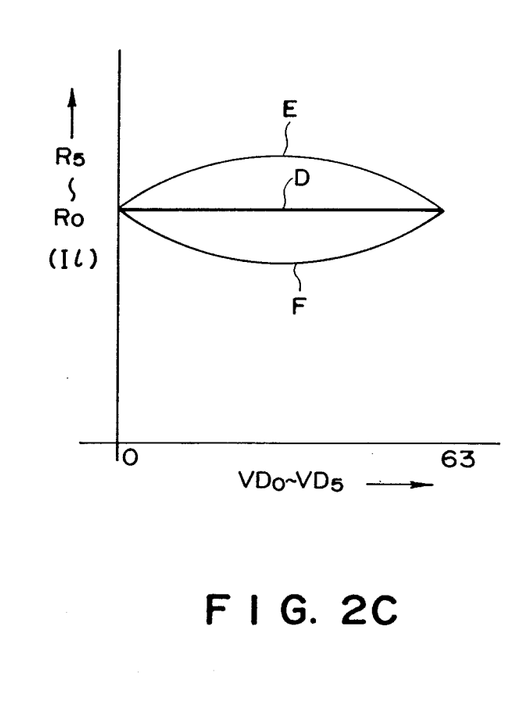

FIG. 1 is a block diagram of a density conversion unit of the image processing apparatus of the present embodiment. Elements identical or similar to those shown in FIG. 4A are designated by like numerals and the explanation thereof is omitted. LD denotes a laser diode which is driven by a switching transistor Q, which in turn is driven by a pulse width modulated signal Pw. A peak current Il which flows through the laser diode LD is determined by a constant current source 4. Namely, the constant current Il can be controlled by applying a voltage level signal Vc to a control terminal of the constant current source 4. FIG. 2A shows an input-output (Vc−Il) characteristic of the device. When the level signal Vc is high, a relatively high current is supplied to the laser diode LD to increase the beam power, and when the level signal Vc is low, a relatively low current is supplied to the laser diode LD to reduce the beam power. Thus, when a level HI of certain pulse width is applied to the base of the switching transistor Q, a drive current waveform having a peak current Il and a pulse width Pwl is produced as shown in FIG. 1B. Numeral 6 denotes a D/A converter which produces an analog level signal VC which is proportional to signals $R_0-R_5$ read from a ROM 5, which is turn is addressed by input bit-parallel image signals $VD_0-VD_5$. The conversion may be made in various manners in accordance with objects. FIGS. 2B and 2C show examples of the conversion table. In a table A, the input data $VD_0-VD_5$ are outputted as they are. Since a higher peak current Il is supplied to an image data closer to the black density, white or black background is well reproduced. In a table A', the relation is opposite. In a table B, the conversion is not linear and a white ouput is emphasized for an intermediate density data. In a table C, the relation is opposite. The above relations are different depending on whether the image is developed by black toner (+) or white toner (−), which may be freely determined depending on the configuration of the image processing apparatus. In a table D, the laser power Il is constant for the image data $VD_0-VD_5$, and no density compensation is done. In a table E, the laser power Il is high for an intermediate density data, and in a table F, the relation is opposite.

Figure 2D:
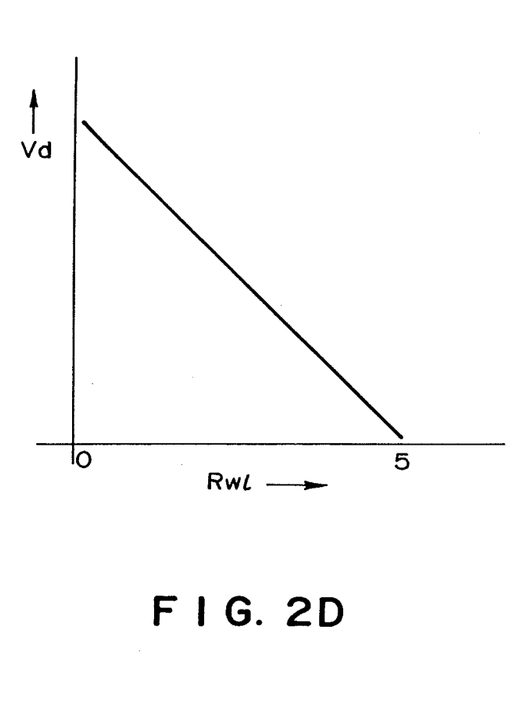
FIG. 2D shows a graph of the relationship between a beam turn-on pulse width Pwl and a potential Vd on a photoconductor drum.

FIG. 2D shows the relationship between the beam turn-on pulse width Pwl and the surface potential Vd on the photoconductor drum. A potential at an area of the photoconductor drum which has been irradiated by the laser beam for a long time is low and substantially inversely proportional to the irradiated pulse width if the beam power is constant. However, since the surface potential Vd is a function of the beam power, as is the beam turn-on time, one can compensate for the non-linearity of the other or one can forcibly create non-linearity.

In the present embodiment, the reproducibility of the image density is improved. Alternatively, a positive density control may be attained in which certain density is emphasized or weakened. In order to achieve those objects, a plurality of conversion tables are prepared in the ROM 5 and selectively used by selective means.

In the present embodiment, the triangle wave signal is used in the pulse width modulation. Alternatively, a sawtooth wave, sine wave or trapezoidal wave may be used.

The image processing apparatus shown in FIG. 1 may be applied to the laser beam printer shown in FIG. 3. The pulse width modulated signal Pw produced by the comparator 3 is used to drive the laser diode LD to form an image on the photoconductor drum 16.

The printer shown in FIG. 3 is of a type which line-scans the beam to form the image, and uses a BD mirror 20 and a fiber 21 as beam detection means to detect the beam scan position for each line. A beam detect (BD) signal from the beam detection means is used to define a record start position (left margin) of the image on the photoconductor drum 16.

The signal generator (SG) 2 in FIG. 1 generates the triangle wave (SAW) for each scan line. A higher quality image may be reproduced by outputting the triangle wave SAW in synchronism with the BD signal.

Figure 5:
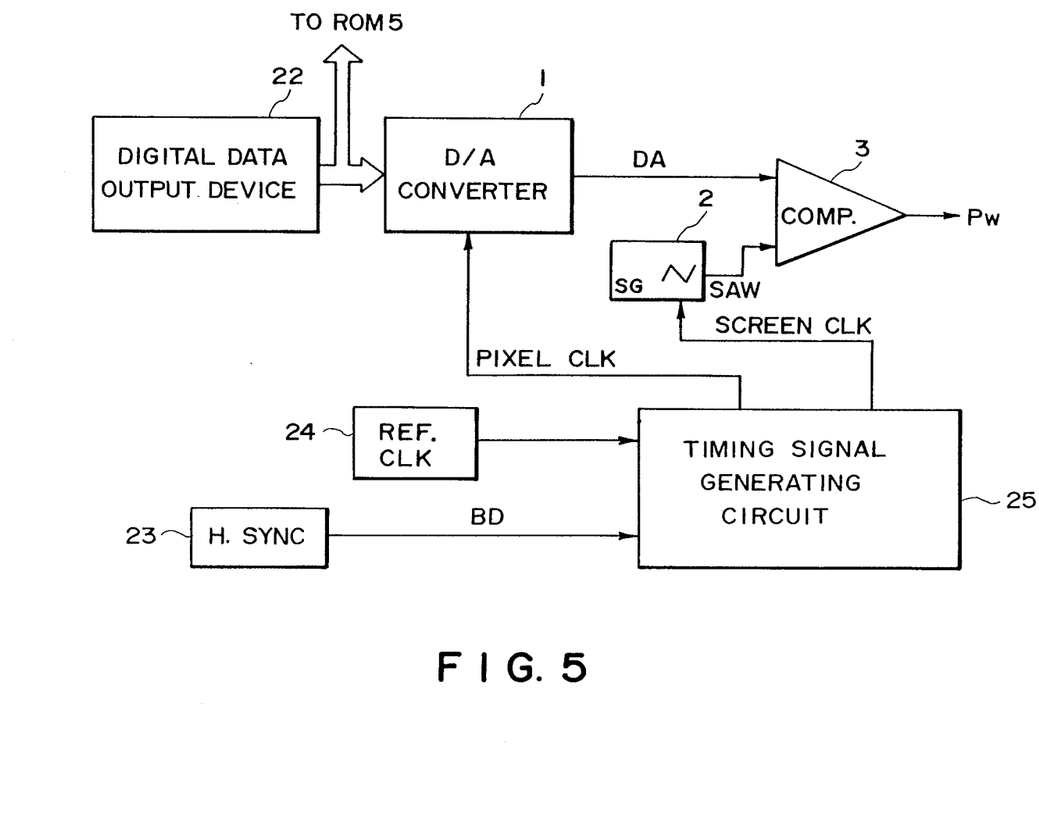
FIG. 5 shows a detail of a portion of FIG. 1.

A relationship between the triangle wave SAW and the BD signal is explained in further detail with reference to FIGS. 5 and 6. FIG. 5 shows a detail of a portion of FIG. 1, and elements similar to those shown in FIG. 1 are designated by like numerals. Numeral 22 denotes a digital data output device which converts an analog image data from a CCD sensor or video camera to a digital signal and produces digital video signals $VD_0-VD_5$ of a predetermined number of bits bearing density information. The digital video signals may be temporarily stored in a memory or may be inputted from an external device by communication therewith. The digital video signals from the digital data output device 22 are supplied to the D/A converter 1 and the ROM 5. The digital image data are converted to an analog signal for each pixel by the digital-analog converter (D/A converter) 1 and each pixel is serially supplied to one input terminal of the comparator 3. The pattern signal generator (SG) 2 generates a triangular analog reference pattern signal having a period corresponding to a desired pitch of a gray level screen and it is appied to the other input terminal of the comparator 3. A horizontal synchronization signal generator 23 has the beam detection means described above. A reference clock (master clock) from an oscillator (reference clock generator) 24 is frequency-divided by a factor of four by a timing signal generator 25 in synchronism with the BD signal generated for each line by the horizontal synchronization signal generator 23. The frequency-divided clock is used as a transfer clock of the digital video signal and a latch timing of the D/A converter 1. In the comparator 43, the levels of the analog-converted video signal and the triangular pattern signal are compared and a pulse width modulated signal Pw is produced. The pulse width modulated signal Pw is supplied to a laser modulator which comprises the transistor Q shown in FIG. 1. As a result, the laser beam is turned on and off in accordance with the pulse width and gray level images are formed on the record medium 16.

Figure 6:
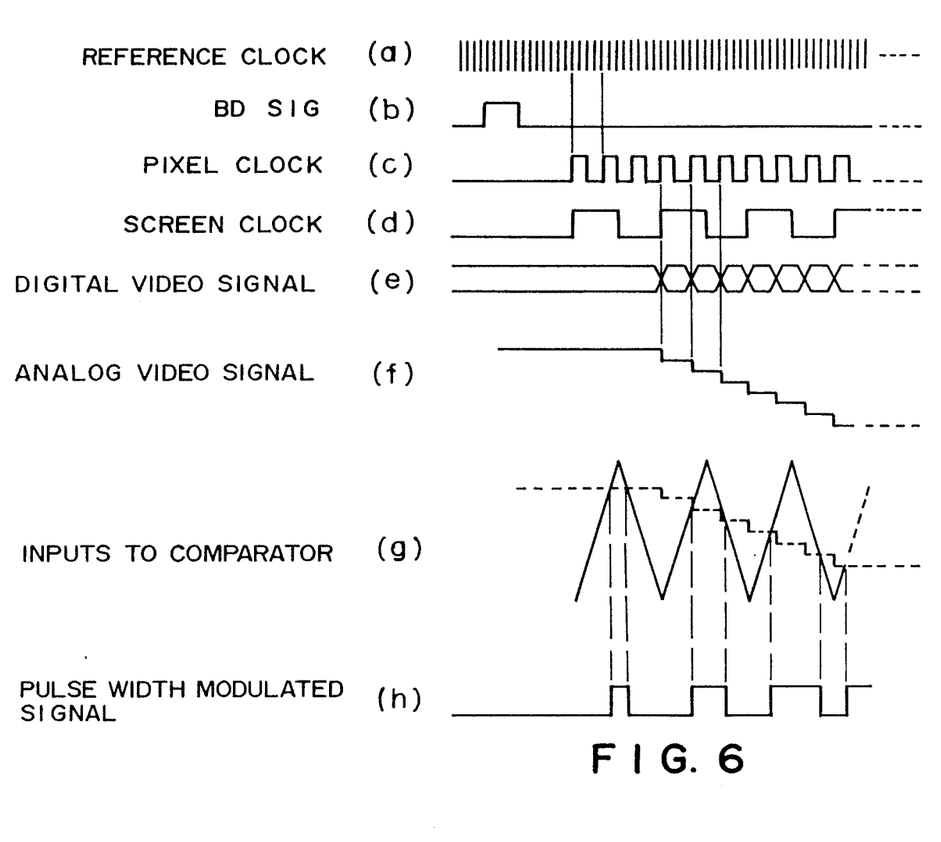
FIG. 6 shows waveforms of the apparatus seen in FIG. 5.

FIG. 6 shows signal waveforms in the circuit of FIG. 5. In FIG. 6, (a) shows the reference clock from the oscillator 24, (b) shows the BD signal, and (c) shows the pixel clock derived by frequency-dividing the reference clock of the oscillator 24 by the timing signal generator 25. The pixel clock (c) of FIG. 6 is produced by frequency-dividing the reference clock by the factor of four by the timing signal generator 25 in synchronism with the BD signal, and it is supplied to the D/A converter 1 and used as the transfer clock of the digital video signal. In FIG. 6, (d) shows a pattern signal synchronization clock (screen clock) having a period which corresponds to three image periods, produced by frequency-dividing the reference clock by a factor of twelve by the timing signal generator 25 in synchronism with the BD signal. The screen clock (d) of FIG. 6 is used as a synchronization signal for generating the triangular wave and it is supplied to the signal generator (SG) 2. In Fig. 6, (e) shows the digital video signal (code data) produced by the digital data output device 22, and (f) shows the analog video signal converted by the D/A converter 1. As seen from FIG. 6, the analog pixel data is produced in synchronism with the pixel clock. The output of the signal generator (SG) 2 is generated in synchronism with the screen clock (d) of FIG. 6 as shown by a solid line (g) of FIG. 6 and it is supplied to the comparator 2. A broken line (g) in FIG. 6 shows the analog image data (analog video signal) (f) of Fig. 6. The analog video signal is compared with the triangular wave (pattern signal) from the signal generator (SG) 2 by the comparator 3 to produce the pulse width modulated signal Pw (h) of FIG. 6.

In accordance with the present embodiment, since the digital image signal is first converted to the analog image signal, which is then compared with the triangular wave signal, essentially continuous pulse width modulation is attained and a high tonality image output is produced.

In the present embodiment, the pattern signal synchronization clock (screen clock) synchronized with the horizontal synchronization signal (BD signal) is produced by using the reference clock of a higher frequency than that of the pattern signal synchronization clock used to generate the pattern signal (e.g. triangle wave). Therefore, in the present embodiment, jitter of the pattern signal generated by the pattern signal generator 3, for example, offset between a first line pattern signal and a second line pattern signal is less than one twelveth of the period of the pattern signal. This precision is necessary to assure high image quality gray level reproduction having the line screen uniformly and smoothly formed for each line.

The present embodiment can provide a high quality image because it correctly pulse-width-modulates the density information by using the jitter-free pattern signal.

The present invention is not limited to the illustrated embodiment but various modifications may be made within the scope of the appended claims.

What I claim is:

1. An image processing apparatus comprising:
   digital image data generation means for generating digital image data;
   pulse width modulated signal generation means for generating a pulse width modulated signal for modulating a recording beam in accordance with the digital image data generated by said digital image data generation means; and
   control signal generation means for generating a control signal to control the intensity of the recording beam in accordance with the digital image data generated by said digital image data generation means;
   wherein said pulse width modulated signal generating means processes said digital image data by using a pattern signal to produce the pulse width modulated signal and wherein said pattern signal is an analog pattern signal.

2. An image processing apparatus according to claim 1, wherein said analog pattern signal is generated in accordance with a synchronization signal associated with said recording beam.

3. An image processing apparatus according to claim 2, further comprising image formation means for modulating said recording beam in accordance with said pulse width modulated signal to form an image on a record medium, wherein said image formation means includes synchronization signal generation means for detecting a scan position of said recording beam to generate said synchronization signal.

4. An image processing apparatus according to claim 1, wherein said analog pattern signal is a triangle wave, and said pulse width modulated signal generation means compares said digital data with said triangle wave to produce said pulse width modulated signal.

5. An image processing apparatus according to claim 2, further comprising reference clock signal generation means for generating a reference clock signal, and screen clock generation means for frequency-dividing said reference clock in accordance with said synchronization signal to generate a screen clock for generating said analog pattern signal.

6. An image processing apparatus comprising:
   digital image data generation means for generating digital image data;
   pulse width modulated signal generation means for generating a pulse width modulated signal for modulating a recording beam in accordance with the digital image data generated by said digital image data generation means; and
   control signal generation means for generating a control signal to control the intensity of the recording beam in accordance with the digital image data generated by said digital image data generation meaans;
   wherein said pulse width modulated signal generating means processes said digital image data by using a pattern signal to produce the pulse width moduled signal and wherein said pattern signal is an analog pattern signal and wherein said control signal generation means includes memory means for receiving said digital image data and outputting a digital converted data and D/A conversion means for converting the digital converted data from said memory means to an analog signal.

7. An image processing apparatus according to claim 6, further comprising modulation means for modulating the recording beam in accordance with said pulse width modulated signal, wherein a current of said modulation means for determining an intensity of said recording beam is controlled by the analog output of said A/D conversion means.

8. An image processing apparatus comprising:

digital image data generation means for generating digital image data;

pulse width modulated signal generation means for generating a pulse width modulated signal for modulating a recording beam in accordance with the digital image data generated by said digital image data generation means; and control means for generating a control signal to control the intensity of said recording beam;

wherein said pulse width modulated signal generation means processes said digital image data by using an analog pattern signal to produce the pulse width modulated signal.

9. An image processing apparatus according to claim 6, wherein said pattern signal is an analog pattern signal, and said pulse width modulated signal generation means is adapted to convert said digital image data into an analog signal and compare the analog signal with the analog pattern signal so as to output a pulse width modulated signal.

10. An image processign apparatus according to claim 11, wherein said analog pattern signal is generated in accordance with a synchronization signal associated with said recording beam.

11. An image processing apparatus according to claim 12, further comprising image formation means for modulating said recording beam in accordance with said pulse width modulated signal to form an image on a record medium, wherein said image formation means include synchronization signal generation means for detecting a scan position of said recording beam to generate said synchronization signal.

12. An image processing apparatus according to claim 10, further comprising reference clock signal generation means for generating a reference clock signal, and screen clock generation means for frequency-dividing said reference clock in accordance with said synchronization signal to generate a screen clock for generating said analog pattern signal.

13. An image processing apparatus according to claim 8, wherein said control generation means includes memory means for receiving said digital image data and outputting a digital converted data and D/A conversion means for converting the digital converted data from said memory means to an analog signal.

14. An image processing apparatus according to claim 9, wherein said control signal generation means generates a control signal for controlling the intensity of the recording beam in accordance with one of a plurality of beam intensity decision data.

* * * * *